(12) United States Patent
Uniyal et al.

(10) Patent No.: US 12,361,640 B2
(45) Date of Patent: Jul. 15, 2025

(54) DYNAMIC METAVERSE ACCOMMODATIONS

(71) Applicant: Bank of America Corporation, Charlotte, NC (US)

(72) Inventors: Rahul Uniyal, Dehradun Uttarakhand (IN); Mohit Dhingra, Hyderabad (IN); Srikanth Vemula, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 166 days.

(21) Appl. No.: 18/381,680

(22) Filed: Oct. 19, 2023

(65) Prior Publication Data

US 2025/0131646 A1    Apr. 24, 2025

(51) Int. Cl.
| | | |
|---|---|---|
| *G06T 17/00* | (2006.01) | |
| *G06T 7/70* | (2017.01) | |
| *G06V 10/44* | (2022.01) | |

(52) U.S. Cl.
CPC ............. *G06T 17/00* (2013.01); *G06T 7/70* (2017.01); *G06V 10/44* (2022.01); *G06T 2207/20081* (2013.01); *G06T 2207/20084* (2013.01)

(58) Field of Classification Search
CPC . G06T 17/00; G06T 7/70; G06T 2207/20081; G06T 2207/20084; G06V 10/44
See application file for complete search history.

(56) References Cited

U.S. PATENT DOCUMENTS

| | | |
|---|---|---|
| 7,353,153 B2 | 4/2008 | Ascenzi et al. |
| 9,875,580 B2 | 1/2018 | Cannon et al. |
| 10,326,667 B2 | 6/2019 | Jones et al. |
| 10,353,378 B2 | 7/2019 | Shapiro et al. |

(Continued)

FOREIGN PATENT DOCUMENTS

| | | |
|---|---|---|
| CN | 106919270 | 4/2020 |
| CN | 107613897 | 12/2021 |

(Continued)

OTHER PUBLICATIONS

Chen et al., "Decision Transformer: Reinforcement Learning via Sequence Modeling," https://arxiv.org/pdf/2106.01345.pdf, Jun. 24, 2021.

(Continued)

*Primary Examiner* — King Y Poon
(74) *Attorney, Agent, or Firm* — Weiss & Arons LLP

(57) ABSTRACT

Systems, methods, and apparatus are provided for generating dynamic metaverse accommodations using artificial intelligence. A user device may initiate a metaverse session. Deep learning networks may derive a user profile based on data from the user device and generate a set of samples from the user profile. The generated samples may include user characteristics and avatar features associated with the user characteristics. The generated samples may be used to train a multitask machine learning model. Deep learning networks may generate a metaverse accommodation targeted to the user profile. The accommodation may be rendered in the metaverse environment. The accommodation may be transmitted to an actuator at the user device. The accommodation may be stored in association with user characteristics in a distributed ledger.

21 Claims, 4 Drawing Sheets

(56) References Cited

U.S. PATENT DOCUMENTS

| | | | |
|---|---|---|---|
| 10,635,088 B1 | 4/2020 | Bandara et al. | |
| 10,871,594 B2 | 12/2020 | Tocornal et al. | |
| 10,878,177 B2 | 12/2020 | Andriotis et al. | |
| 11,148,972 B2 | 10/2021 | Ozersky et al. | |
| 11,537,889 B2 | 12/2022 | Gaitan Ospina et al. | |
| 11,783,100 B2 | 10/2023 | Liu et al. | |
| 11,789,699 B2 | 10/2023 | Streit | |
| 2002/0055089 A1* | 5/2002 | Scheirer | G09B 7/02 434/323 |
| 2015/0286960 A1* | 10/2015 | Habibi | G06Q 10/02 705/5 |
| 2020/0134746 A1* | 4/2020 | Tiwari | G06Q 30/0283 |
| 2020/0356839 A1 | 11/2020 | Tocornal et al. | |
| 2021/0216683 A1 | 7/2021 | Rai et al. | |
| 2021/0264324 A1* | 8/2021 | Kumar | G06F 16/29 |
| 2022/0139554 A1 | 5/2022 | Pillay et al. | |
| 2023/0152961 A1 | 5/2023 | Perea-OcHoa | |
| 2023/0201715 A1 | 6/2023 | Wang | |
| 2023/0270562 A1 | 8/2023 | Roh et al. | |

FOREIGN PATENT DOCUMENTS

| | | |
|---|---|---|
| CN | 109565594 | 3/2022 |
| KR | 10-2450175 | 10/2022 |
| KR | 10-2023-0118794 | 8/2023 |
| WO | WO2023/064933 | 4/2023 |

OTHER PUBLICATIONS

"Convolutional Neural Network," https://en.wikipedia.org/wiki/Convolutional_neural_network, Wikimedia Foundation, Inc., Retrieved on Aug. 25, 2023.

"Looking-Glass Self," https://en.wikipedia.org/wiki/Looking-glass_self, Wikimedia Foundation, Inc., Retrieved on Aug. 25, 2023.

Ramachandra et al., "Transformer Networks for Data Augmentation of Human Physical Activity Recognition," https://arxiv.org/pdf/2109.01081.pdf, Sep. 4, 2021.

Jakob Uszkoreit, "Transformer: A Novel Neural Network Architecture for Language Understanding," https://blog.research.google/2017/08/transformer-novel-neural-network.html, Aug. 31, 2017.

* cited by examiner

DYNAMIC METAVERSE ACCOMMODATIONS

FIELD OF TECHNOLOGY

Aspects of the disclosure relate to using machine learning to generate targeted metaverse accommodations for a person with a disability.

BACKGROUND OF THE DISCLOSURE

The metaverse is a virtual shared space that is accessed via the internet. In its broadest form, the metaverse may encompass the entire social and economic structure that exists in both the actual and virtual worlds. Avatars, content, and goods may all travel around freely within the metaverse.

In the metaverse, a virtual world experience may be created by simulating human emotions and gestures. Individuals in the metaverse may communicate and transact with each other. Such transactions may involve digitally three-dimensional items.

People with disabilities may require accommodations to participate in metaverse interactions. However, given the anonymity conferred by metaverse avatars, it is difficult to customize these accommodations to the needs of a particular user.

It would be desirable to use artificial intelligence (AI) to augment user information and generate a metaverse environment adapted for specific user needs. It would further be desirable to adapt a generated metaverse accommodation to the technical capabilities of a specific user device.

SUMMARY OF THE DISCLOSURE

Systems, methods, and apparatus are provided for generating dynamic metaverse accommodations using artificial intelligence.

A user may initiate a metaverse session at a user device. A first machine learning engine may derive a user profile based on data from the user device. The data may include a mode of user input, a rate of user input, an avatar feature selected by the user, and/or any suitable data.

Based at least in part on the user profile, deep learning networks may generate a set of samples. The generated samples may include user characteristics. The set of samples may include avatar features associated with the user characteristics.

A second machine learning engine may train a deep learning transformer network using the set of samples. The second machine learning engine may be a multitask model. The deep learning networks may generate a metaverse accommodation targeted to the user profile.

The accommodation may be rendered in the metaverse environment. The accommodation may be transmitted to an actuator at the user device. The accommodation may be stored in association with user characteristics in a distributed ledger.

The embodiments set forth herein represent a practical application that uses artificial intelligence to recognize a user with a disability and dynamically render metaverse accommodations targeted to a specific impairment. The accommodations may be implemented in the metaverse environment and integrated with actuators at a user device.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
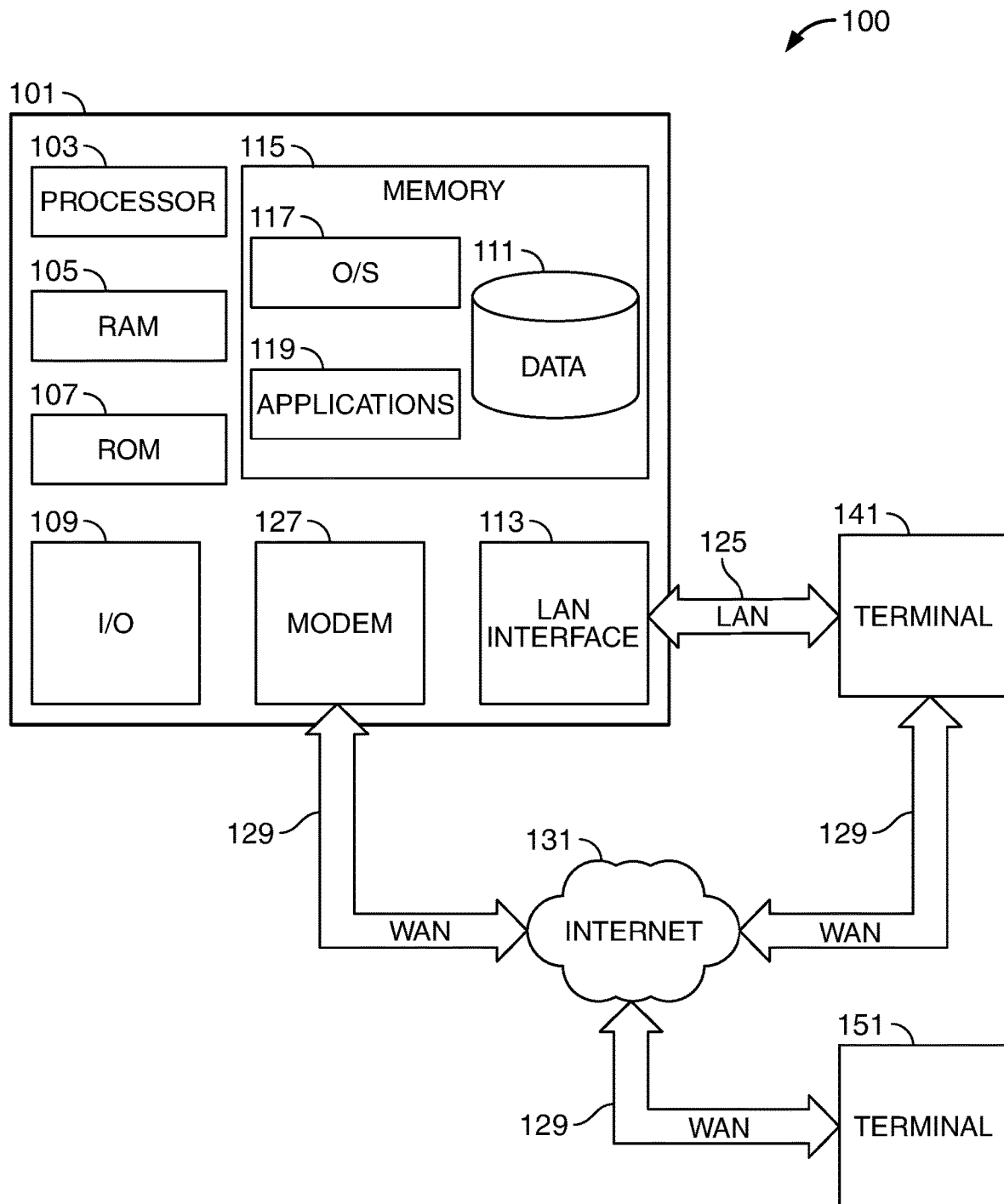
FIG. 1 shows illustrative apparatus in accordance with principles of the disclosure.

Systems, methods, and apparatus are provided for generating dynamic metaverse accommodations using artificial intelligence.

For the sake of illustration, the invention will be described as being performed by a "system." The system may include one or more features of apparatus and methods that are described herein and/or any other suitable device or approach.

Many activities that typically require an in-person interaction at a financial institution branch may also take place in a metaverse environment. For example, a user may provide identification to an agent in order to release funds. The system may enable interactions between the parties in a secure metaverse session.

In some embodiments, an enterprise account holder may register for metaverse interaction with the enterprise. The enterprise may be a financial institution. In some embodiments, a user may be registered automatically for metaverse interaction and may opt out if desired. User registration or opt-out may be received at a banking center, at a financial institution portal, at a mobile device application or via any suitable method. A user may communicate with a mobile device application using an interactive response system or via any suitable method. User registration or opt-out data may be stored in a reference database associated with the enterprise.

In some embodiments, a user device may be registered with the enterprise for metaverse interaction. User device data may be stored in the reference database. User device data may be stored in association with user account data. User device registration may include download or installation of software for secure metaverse access.

The metaverse space may present challenges for people with disabilities. For example, a user with a visual impairment or a motor impairment may face challenges guiding an avatar through the metaverse space. A user with a hearing impairment may face challenges in a verbal exchange between avatars in the metaverse space.

The system may generate metaverse accommodations for users with various disabilities. For example, the system may generate a metaverse object. The metaverse object may be a video that provides guidance for the user. The metaverse object may be an audio recording that provides guidance for the user. The metaverse object may be a sign or other visual aid that is posted in the metaverse space. The metaverse object may be instructions for modified device inputs for the user.

The system may determine the placement of a metaverse object in the metaverse space. The placement of the object may be determined by a feature of the user avatar. The placement of the object may be determined by a characteristic of the user. The placement may be modified to accommodate a user impairment. The position of the metaverse object may be calibrated based on other features of the metaverse space such as windows, doorways, and/or furniture rendered in the space.

The system may integrate a metaverse object with actuators on a user device. For example, the system may transmit a video to a video player at the user device. The system may transmit audio instructions to an audio player at the user device. The system may transmit vibrations to an actuator at the user device. The system may transmit instructions to a braille translator associated with the user device. Any suitable metaverse object may be integrated with any suitable device actuator. The system may convert audio or video content to a compatible device format.

Another illustrative accommodation may include generating a customer care avatar. The customer care avatar may be rendered in the metaverse space. The customer care avatar may provide guidance to the user. The customer care avatar may be controlled by input from an enterprise employee at an employee device. In some embodiments, the customer care avatar may be controlled using artificial intelligence.

The system may be designed with the unique challenges of the metaverse in mind. As set forth above, a user in the metaverse may choose to reveal only limited information about their true self. In some cases, a user with a disability may select an avatar that shares the same impairment. However, in many cases, a user with a disability will choose an avatar that provides no information about the impairment.

The system may use artificial intelligence to determine that the user is a person with a disability. The system may generate accommodations that are targeted to the specific disability.

The system may use artificial intelligence to determine how the user prefers to self-represent in the metaverse space. The system may generate accommodations that are targeted to the preferences of the user. For example, in some cases, the customer care avatar may share the same impairments as the user. In some cases, the customer care avatar may appear absent any impairments.

The system may receive input from a user device. A user may initiate a metaverse session using a mobile device, virtual reality headset, smart glasses, social media application, web browser, gaming console, or via any suitable device or method. The metaverse session may use virtual reality for an immersive experience. In some embodiments, based on the device capabilities, the metaverse session may use augmented reality or mixed reality.

The system may homogenize the input data received from a user. Because input data may be entered at different types of devices, the system may homogenize the data for a uniform input to machine learning algorithms. For example, when data is obtained from an application without access to a camera, the system may mask a layer associated with video input. Masking may enable sequence processing layers in a deep learning network to operate with missing input.

Data received from the user device may be input to a first machine learning engine. The first machine learning engine may augment the input data to increase the sample size.

Data augmentation may proceed along two tracks. A first track may use data gleaned from interactions with the user, such as the mode of input or the speed of the input. For example, the speed of the input could indicate a motor impairment. In another example, the mode of input may involve an assistive device such as a joystick and may indicate a motor impairment. This track may be based on real-time interactions and may include sequential data.

Deep learning algorithms including transformer models may be applied to synthesize new samples based on the user input data. For example, a generated sample may combine different disabilities. A generated sample may alter the physical stature of the user to make a hypothetical user taller or shorter. A generated sample may vary the degree of impairment. Any suitable variations may be applied.

A second track may include data entered directly by the user, such as selection of a user avatar. Deep learning algorithms for video data such as convolutional neural networks may be applied to understand the visual data. The system may determine if the avatar is likely to be representative of the actual physical abilities of the user. Generative adversarial networks may be applied to synthesize additional avatar samples from the available data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input.

The first machine learning engine may incorporate recurrent neural networks for sequential processing as well as transformer networks for feed forward processing with self-attention. Transformer networks excel at parallel processing of data.

The first machine learning engine may include a convolutional neural network (CNN) that combines a joint feature extractor, classifier, and regressor in a unified framework. The CNN may be a recurrent convolutional neural network (RCNN).

The first machine learning engine may generate images using a generative adversarial network (GAN). A generative network may generate candidate images and a discriminative network may evaluate the candidates. In some embodiments, backpropagation may be applied in both networks to produce better images. A self-attention mechanism may include attention-driven long-range dependency modeling for image generation. Attention functions may complement convolution operations and help the network capture fine details.

The first machine learning engine may output a sample set that includes the characteristics of a generated set of users with disabilities. The first machine learning engine may output a sample set that includes a generated set of avatar selections for these users with disabilities.

The sample sets generated by the first machine learning engine may be input to the second machine learning engine. The second machine learning engine may be a multitask model.

The second machine learning engine may include transformer networks for processing sequential activities and vision transformer networks for the avatar data. The visual data may be processed through convolution layers and max pool layers and may be sent to various task specific layers.

Task specific layers may perform any suitable tasks to generate and render metaverse accommodations. For example, task specific layers may generate a metaverse object, such as a video stream. Task specific layers may generate a customer care avatar. Task specific layers may determine if the customer care avatar should have a disability and what that disability should be. The second machine learning engine may use soft parameter sharing for the various transformers for multi-model task specific sharing.

The second machine learning engine may also receive input from a customer database. For example, information about an impairment may be stored in conjunction with customer account information. In some cases, accommodations that were generated for a previous metaverse session may be stored in conjunction with a customer account.

One or both of the machine learning engines may require additional hardware for parallel processing of large amounts of visual data. The machine learning engines may require a graphical processing unit (GPU). A GPU may accelerate image processing.

The second machine learning engine may output modifications to the metaverse environment that are tuned to the input data. For example, the output may include generating a customer care avatar to guide the user in the metaverse environment. The output may include generating metaverse objects such as a video message or an audio message. For example, an audio message may guide a person with visual impairment through the metaverse environment.

The output may be de-homogenized for use at a particular user device. The output may be transmitted to an actuator associated with the device. The device actuator may implement the accommodations. For example, an audio component of the device may play instructions for navigating the metaverse space. The accommodation format may be modified for implementation by device-specific actuators.

The accommodations generated for the metaverse interaction may be anonymized and stored in a distributed ledger for reference by other enterprises. The distributed ledger may be a blockchain. The blockchain may be a consortium blockchain that is shared by a set of organizations. The stored accommodations may later be applied by these organizations for other users presenting with similar input data. Alternatively, a block may be dedicated to a single entity or organization and used exclusively thereby.

The accommodations generated for the metaverse interaction may also be stored as global guidelines for the enterprise to be applied for similar scenarios. The guidelines may be user specific. The guidelines may be institution specific.

One or more: non-transitory computer-readable media storing computer-executable instructions are provided. When executed by a processor on a computer system, the instructions may perform a method for dynamic modifications to a metaverse space.

The method may include initiating a metaverse session at a user device. The user device may connect to a metaverse gateway.

The method may include using a first machine learning engine. The first machine learning engine may generate a user profile based on data from the user device. The device data may include a mode of user input, a rate of user input, and/or an avatar feature selected by the user.

The first machine learning engine may generate a set of samples from the user profile. The set of samples may include user characteristics. The set of samples may include avatar feature selections associated with the user characteristics.

The method may include inputting the generated sample set to a second machine learning engine. The second machine learning engine may train a deep learning transformer network using the set of samples. The second machine learning engine may use the deep learning transformer network to generate a metaverse accommodation for the user profile.

The method may include rendering the generated accommodation in the metaverse space. The method may include transmitting the generated accommodation to an actuator at the user device. The method may include storing the generated accommodation in association with the user profile in a distributed ledger. In some embodiments, the distributed ledger may be a consortium blockchain shared by a group of organizations. In some embodiments, the distributed ledger may be uniquely accessible to a single entity or organization.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may be include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for dynamically generating metaverse accommodations as detailed herein.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
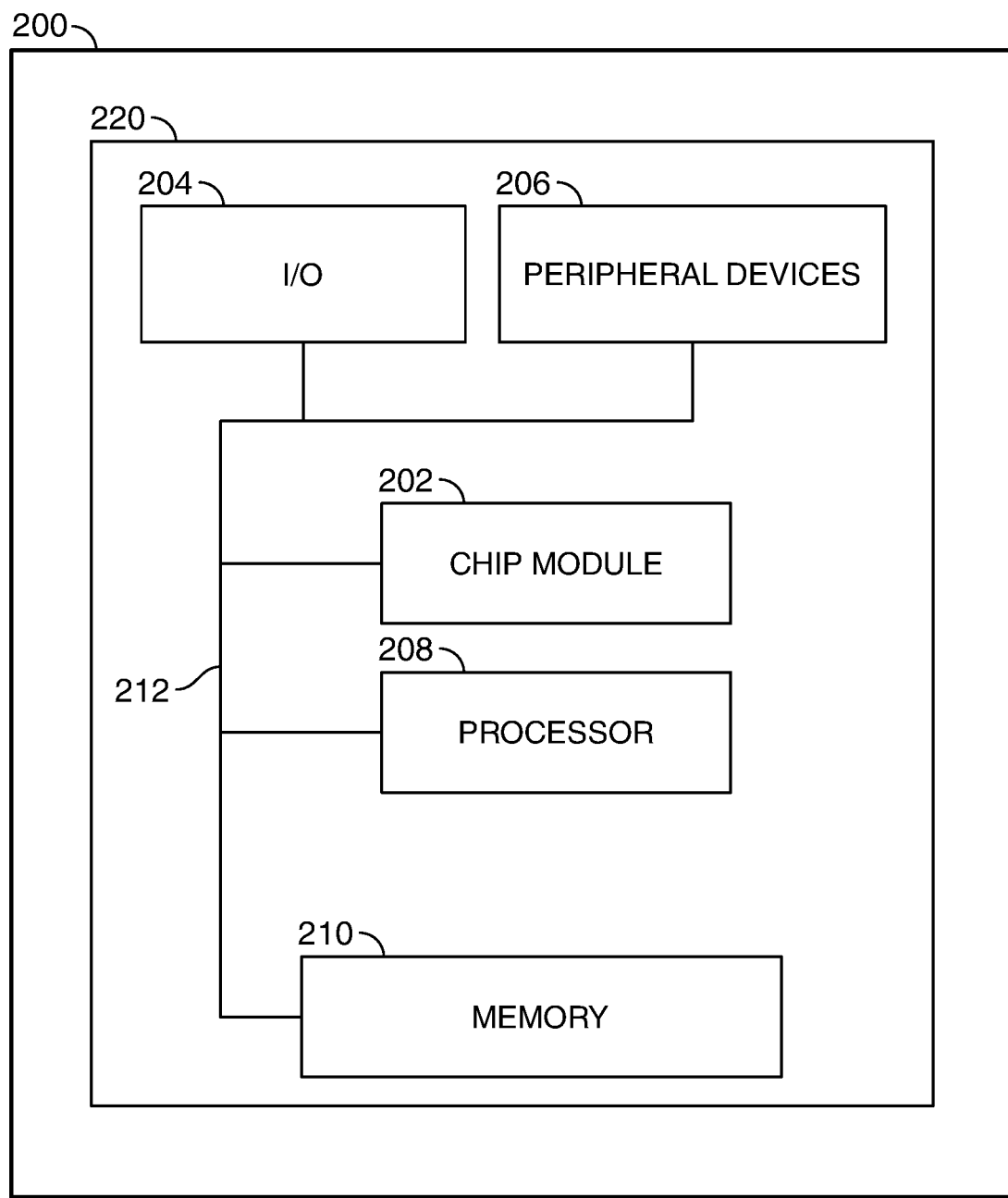
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
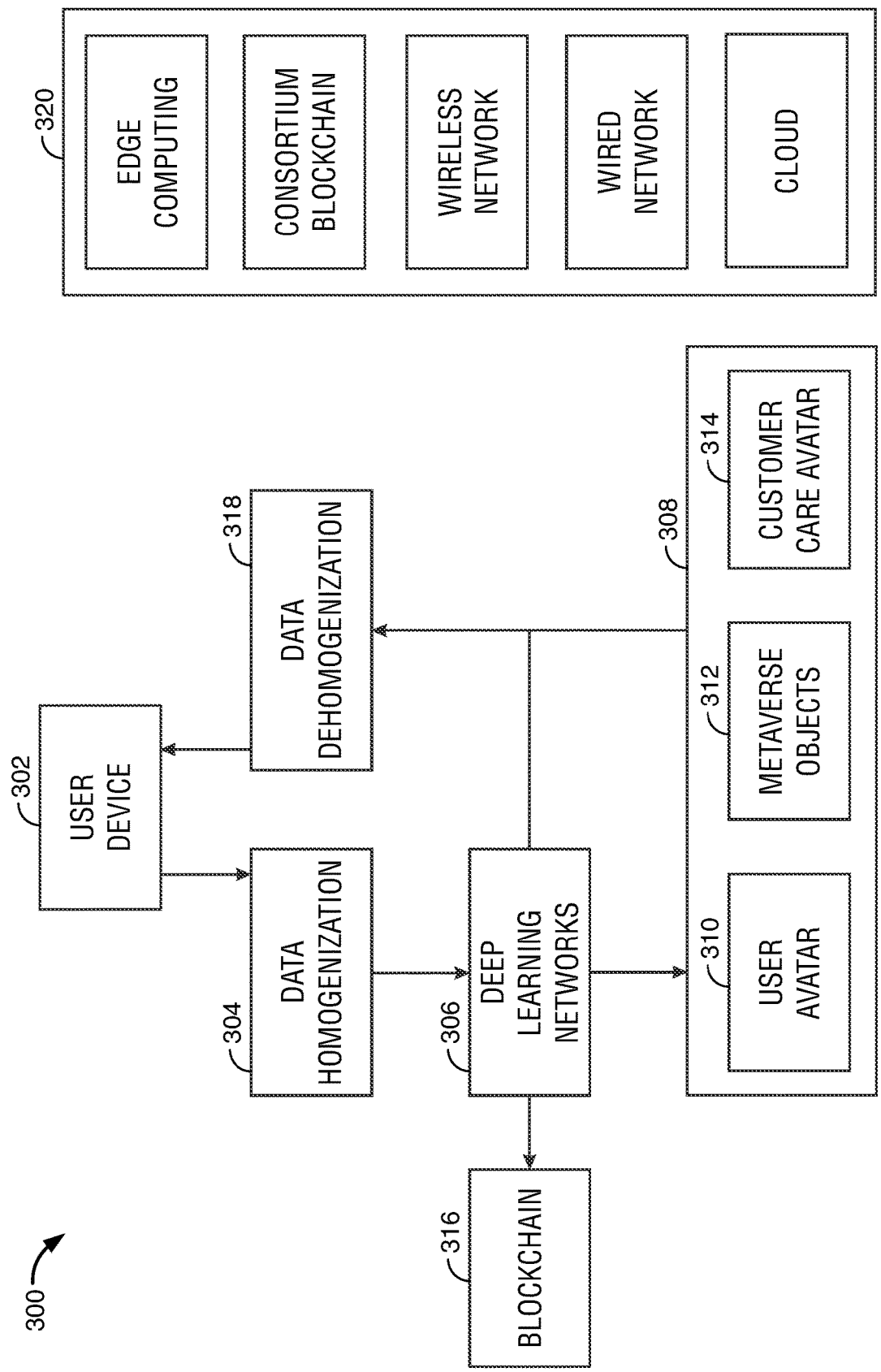
FIG. 3 shows an illustrative process flow in accordance with principles of the disclosure.

FIG. 3 shows illustrative process flow 300 for providing dynamic metaverse accommodations. At 302, input may be received at a user device. At 304, the data may be preprocessed for input to a machine learning engine. At 306, the input may be received at deep learning networks such as CNNs, GANs, and/or transformers.

Accommodations that were output by the deep learning networks may be rendered in metaverse space 308. Metaverse space 308 includes user avatar 310, generated metaverse objects 312, and customer care avatar 314. Metaverse objects 312 may include accommodations rendered in the metaverse space. At 316, the accommodations output by the deep learning networks may be anonymized and stored in a blockchain.

At 318, metaverse accommodation data may be processed for compatibility with the user device. For example, a video format used by a gaming console may be different from the format used at a web browser. The modified metaverse accommodation data may be transmitted to an actuator associated with user device 302.

At 320, various system networking features are shown. Any or all of these features may apply to process flow 300. Process flow 300 may involve edge computing to reduce latency and provide dynamic accommodations in real time. The deep learning networks may be hosted on an edge platform.

Process 300 may involve a consortium blockchain. Blockchain 316 may be a consortium blockchain that is shared by a group of organizations. Any of the organizations in the consortium may be able to access the stored accommodation data.

Process 300 may involve wired or wireless networks. Process 300 may involve cloud computing for data processing, for rendering accommodations, for maintaining the metaverse session, or for any suitable purpose.

Figure 4:
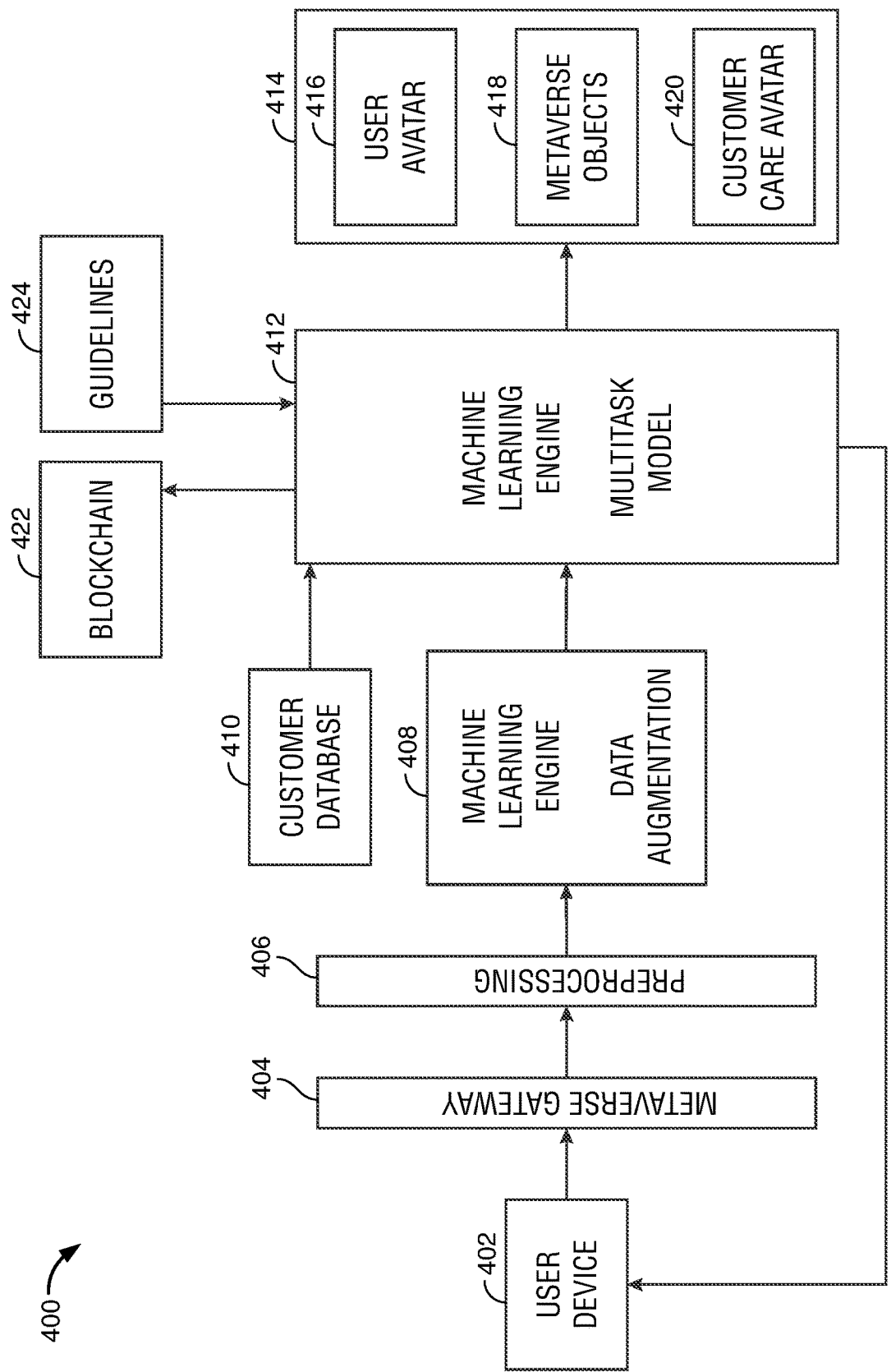
FIG. 4 shows an illustrative process flow in accordance with principles of the disclosure.

FIG. 4 shows illustrative process flow 400 for providing dynamic metaverse accommodations. At 402, data is received at a user device. At 404, the user device initiates a metaverse session by connecting to a metaverse gateway. At 406, the device data is preprocessed for a uniform format. At 408, the device data is input to a first machine learning engine. The first machine learning engine may augment the data to generate a sample set that includes a range of simulated people with disabilities.

At 412, the generated sample set may be input to second machine learning engine. The second machine learning engine may be a multitask model that generates metaverse accommodations based on the input data. At 410, additional input data may be received from a customer database. The second machine learning engine may use decision transformers, vision transformers, and/or other transformer models for feed-forward attention-based deep learning.

At 414, the accommodations may be applied in the metaverse space. The metaverse space may include user avatar 416, metaverse object 418, and customer care avatar 420. Customer care avatar 420 may interact with user avatar 416 in the metaverse space. The accommodation may also be transmitted to actuators at user device 402.

At 422, accommodations generated by the second machine learning engine may be stored in a blockchain for access by other organizations. At 424, accommodations generated by the second machine learning engine may be stored as institutional guidelines.

Thus, methods and apparatus for DYNAMIC METAVERSE ACCOMMODATIONS are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for dynamic modifications to a metaverse environment, the method comprising:
   at a user device, initiating a metaverse session;
   at a first machine learning engine:
      deriving a user profile based on data from the user device, the data comprising a mode of user input, a rate of user input, and an avatar feature selected by the user; and
      based at least in part on the user profile, generating a set of samples, the set of samples comprising user characteristics and avatar features associated with the user characteristics;
   at a second machine learning engine:
      training a deep learning transformer network using the set of samples; and
      using the deep learning transformer network, generating a metaverse accommodation for the user profile;
   rendering the accommodation in the metaverse environment;
   transmitting the accommodation to an actuator at the user device; and
   storing the accommodation in association with the user profile in a distributed ledger.

2. The method of claim 1, the accommodation comprising a metaverse object, a position of the object in the metaverse environment, and a customer care avatar.

3. The method of claim 2, the metaverse object comprising an audio message.

4. The method of claim 3, the audio message comprising navigation instructions for the metaverse environment.

5. The method of claim 1 further comprising using a graphical processing unit (GPU) for the first machine learning engine and the second machine learning engine.

6. The method of claim 1, further comprising preprocessing input from the user device, the preprocessing comprising masking a layer of input data for the first machine learning engine.

7. The method of claim 1, further comprising storing the machine learning model trained using the sample sets in the distributed ledger.

8. The method of claim 1, further comprising using a convolutional neural network (CNN) and a generative adversarial network (GAN) to generate a sample based on the avatar feature selected by the user.

9. One or more non-transitory computer-readable media storing computer-executable instructions which, when executed by a processor on a computer system, perform a method for dynamic modifications to a metaverse space, the method comprising:
   at a user device, initiating a metaverse session;
   at a first machine learning engine:
      deriving a user profile based on data from the user device, the data comprising a mode of user input, a rate of user input, and an avatar feature selected by the user; and
      based at least in part on the user profile, generating a set of samples, the set of samples comprising user characteristics and avatar features associated with the user characteristics;
   at a second machine learning engine:
   training a deep learning transformer network using the set of samples; and
   using the deep learning transformer network, generating a metaverse accommodation for the user profile;
   rendering the accommodation in the metaverse space;
   transmitting the accommodation to an actuator at the user device; and
   storing the accommodation in association with the user profile in a distributed ledger.

10. The media of claim 9, the accommodation comprising a metaverse object, a position of the object in metaverse space, and a customer care avatar.

11. The media of claim 10, the metaverse object comprising an audio message.

12. The media of claim 11, the audio message comprising navigation instructions for the metaverse space.

13. The media of claim 9, further comprising using a graphical processing unit (GPU) for the first machine learning engine and the second machine learning engine.

14. The media of claim 9, further comprising preprocessing input from the user device, the preprocessing comprising masking a layer of input data for the first machine learning engine.

15. The media of claim 9, further comprising storing the machine learning model trained using the sample sets in the distributed ledger.

16. A system for dynamic modifications to a metaverse environment, the system comprising:
- a user device configured to initiate a metaverse session via a metaverse gateway;
- a processor configured to:
  - at a first machine learning engine:
    - generate a user profile based on data from the user device, the data comprising a mode of user input, a rate of user input, and an avatar feature selected by the user; and
    - based at least in part on the user profile, generate a set of samples, the set of samples comprising user characteristics and avatar features associated with the user characteristics;
  - at a second machine learning engine:
    - train a deep learning transformer network using the set of samples; and
    - using the deep learning transformer network, generate a metaverse accommodation for the user profile;
  - render the accommodation in the metaverse session;
  - transmit the accommodation to an actuator at the user device; and
  - store the accommodation in association with the user profile in a distributed ledger.

17. The system of claim 16, the accommodation comprising a metaverse object, a position of the object in metaverse space, and a customer care avatar.

18. The system of claim 17, the metaverse object comprising an audio message.

19. The system of claim 18, the audio message comprising navigation instructions for the metaverse space.

20. The system of claim 16, the processor further configured to preprocess input from the user device, the preprocessing comprising masking a layer of input data for the first machine learning engine.

21. The system of claim 16, the processor further configured to store the machine learning model trained using the sample sets in the distributed ledger.

* * * * *